United States Patent [19]

Geogaris

[11] Patent Number: 5,044,266
[45] Date of Patent: Sep. 3, 1991

[54] BARBACUE GRILL WITH WATER-FILLED FAT-COLLECTING TROUGH

[76] Inventor: Robert S. Geogaris, 1805 Imperial Golf Course Blvd., Naples, Fla. 33942

[21] Appl. No.: 377,608

[22] Filed: Jul. 10, 1989

[51] Int. Cl.$^5$ .............................................. A47J 37/07
[52] U.S. Cl. .......................................................... 99/446
[58] Field of Search ................. 99/385, 393, 400, 402, 99/444, 445, 446, 450; 126/29, 30, 25 R, 41 R, 348, 51

[56] References Cited

U.S. PATENT DOCUMENTS

| | | | |
|---|---|---|---|
| 1,802,085 | 4/1931 | Detwiler | 99/446 |
| 2,097,793 | 11/1937 | Howell | 99/446 |
| 3,087,414 | 4/1963 | Gannon | 99/393 |
| 3,443,510 | 5/1969 | Norton | 99/445 |
| 3,552,301 | 1/1971 | McNett | 99/445 |
| 3,959,620 | 5/1976 | Stephen, Jr. | 99/446 X |
| 4,108,142 | 8/1978 | Barson et al. | 126/25 R X |
| 4,140,049 | 2/1979 | Stewart | 126/25 R X |
| 4,567,876 | 2/1986 | Ogden | 126/25 R X |
| 4,606,261 | 8/1986 | Bernardi | 99/445 |
| 4,630,593 | 12/1986 | Gremillion | 126/25 R |
| 4,694,816 | 9/1987 | Fabbro | 126/41 R |
| 4,850,333 | 7/1989 | Dellrud et al. | 126/51 X |

FOREIGN PATENT DOCUMENTS

| | | | |
|---|---|---|---|
| 0099551 | 2/1984 | European Pat. Off. | 99/444 |
| 672387 | 3/1939 | Fed. Rep. of Germany | 99/445 |
| 760993 | 3/1934 | France | 99/446 |
| 2156201 | 10/1985 | United Kingdom | 99/446 |

Primary Examiner—Harvey C. Hornsby
Assistant Examiner—Scott J. Haughland

[57] ABSTRACT

My present invention relates to a barbeque grill and more specifically to a two-tiered barbeque grill system which uses water troughs strategically placed below the cooking surface so as to catch all of the melted fats thus preventing the grease from coming into direct contact with the hot coals below and causing undesirable flare-ups. Meats barbequed on conventional grills over charcoal have always resulted in troublesome flare-ups which burn and char the meat. These flare-ups have always proved difficult to contain, control, or eliminate. It is the primary object of my invention to provide a barbeque grill system that is capable of eliminating these undesirable flare-ups.

2 Claims, 3 Drawing Sheets

BARBACUE GRILL WITH WATER-FILLED FAT-COLLECTING TROUGH

BACKGROUND OF INVENTION

1. Field of Invention

The present invention relates to a barbeque grill system which permits the cooking of foods directly over a heat source without experiencing undesirable flare-ups which normally occur when fat from the food melts and drips down onto the hot coals below.

2. Description of Prior Art

The desirability of cooking foods outdoors in a barbeque kettle over direct heat without experiencing undesirable flare-ups has produced many attempts to solve this problem as is demonstrated by considerable examples of prior art. Of these examples, only two were discovered that illustrated melted fats dripping into water-filled containers. They are Fabbro, U.S. Pat. No. 4,694,816 and Dellrud, U.S. Pat. No. 4,850,333. Both constructions, however, rely on cooking with indirect radiant heat rather than direct heat to accomplish their objectives. Using radiant heat is similar to cooking foods in a conventional oven and does not achieve the barbeque flavor as do foods cooked over the direct heat of the coals. The present invention permits foods to be cooked over direct heat.

Both of these patents also demonstrate another disadvantage which is that, in having to rely on indirect heat to avoid flare-ups, they severely restrict the amount of grill surface available for cooking. The present invention, cooking over direct heat, allows a much larger grill surface to be utilized.

Other patents describing the closest subject matter provide for a number of more or less complicated features that fail to achieve the preferred method of cooking over direct heat and still prevent melted fats from coming into contact with the hot coals with in the kettle itself. None of these patents suggest the novel features of the present invention.

SUMMARY

The following is a description of how the grill is intended to function:

When the charcoal is burning satisfactorily and properly spread, the second grill ring is placed in position in the kettle and the water reservoir partially filled with water. The four leveling screws are then adjusted so as to ensure even water distribution through the series of upright channels that comprise the water troughs. When this has been accomplished the reservoir is filled completely.

The first grill ring, which comprises the cooking surface, is then placed over the second grill ring using the locating lugs to ensure proper parallel alignment of the first grill ring's inverted channels over the second grill ring's upright channels. The meat is then placed on the cooking surface.

As the heat from the coals rises up between and through the channels the fat in the meat beings to melt and drips down between the inverted channels of the cooking surface into the water troughs of the upright channels below. It can readily be seen that, due to the design of the grill, no melted fats are permitted to come into contact with the hot coals and cause flare-ups even though the food is being cooked over direct heat.

From the foregoing description it can be determined that I have provided a barbeque system which may be associated with widely used conventional barbeque kettles and which is simple to use and easy to clean.

While I have shown and described what I believe to be a preferred embodiment of my present invention, it will be understood by those skilled in the art that various re-arrangements and modifications may be made therein without departing from the spirit and scope of my invention.

DESCRIPTION OF PREFERRED EMBODIMENTS

Figure 1:
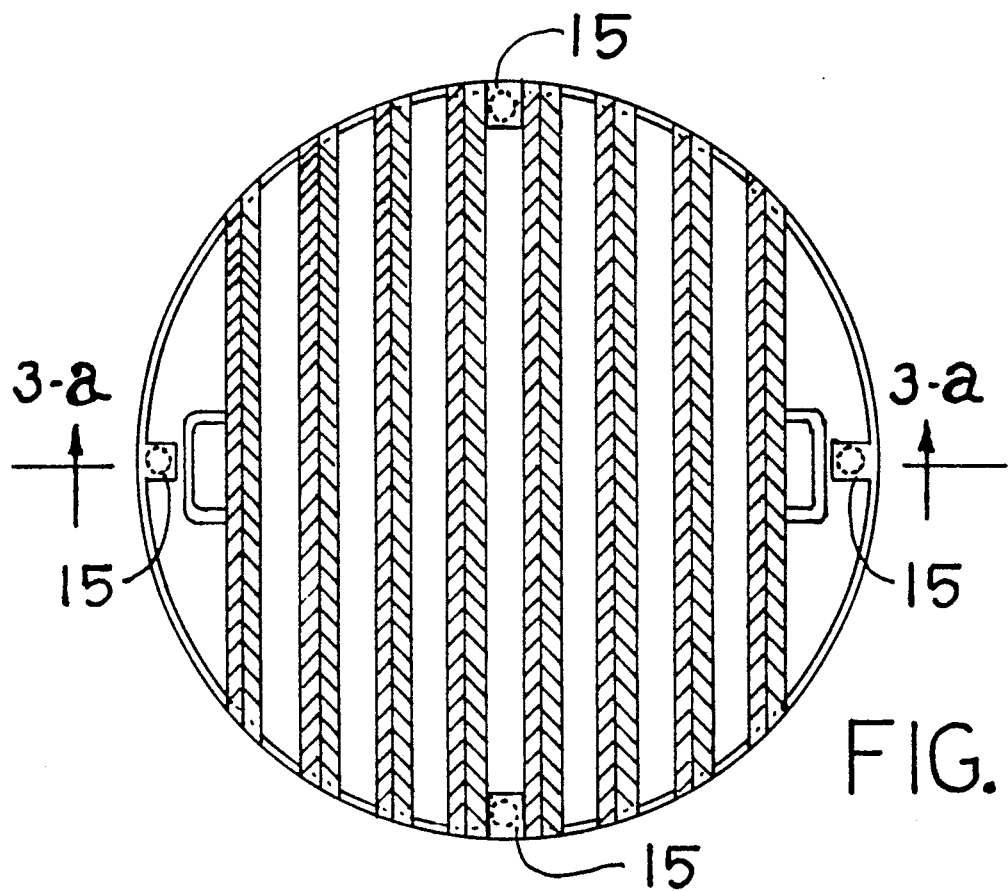
FIG. 1 is a plan view of the first grill ring having associated therewith the cooking surface.
Figure 3:
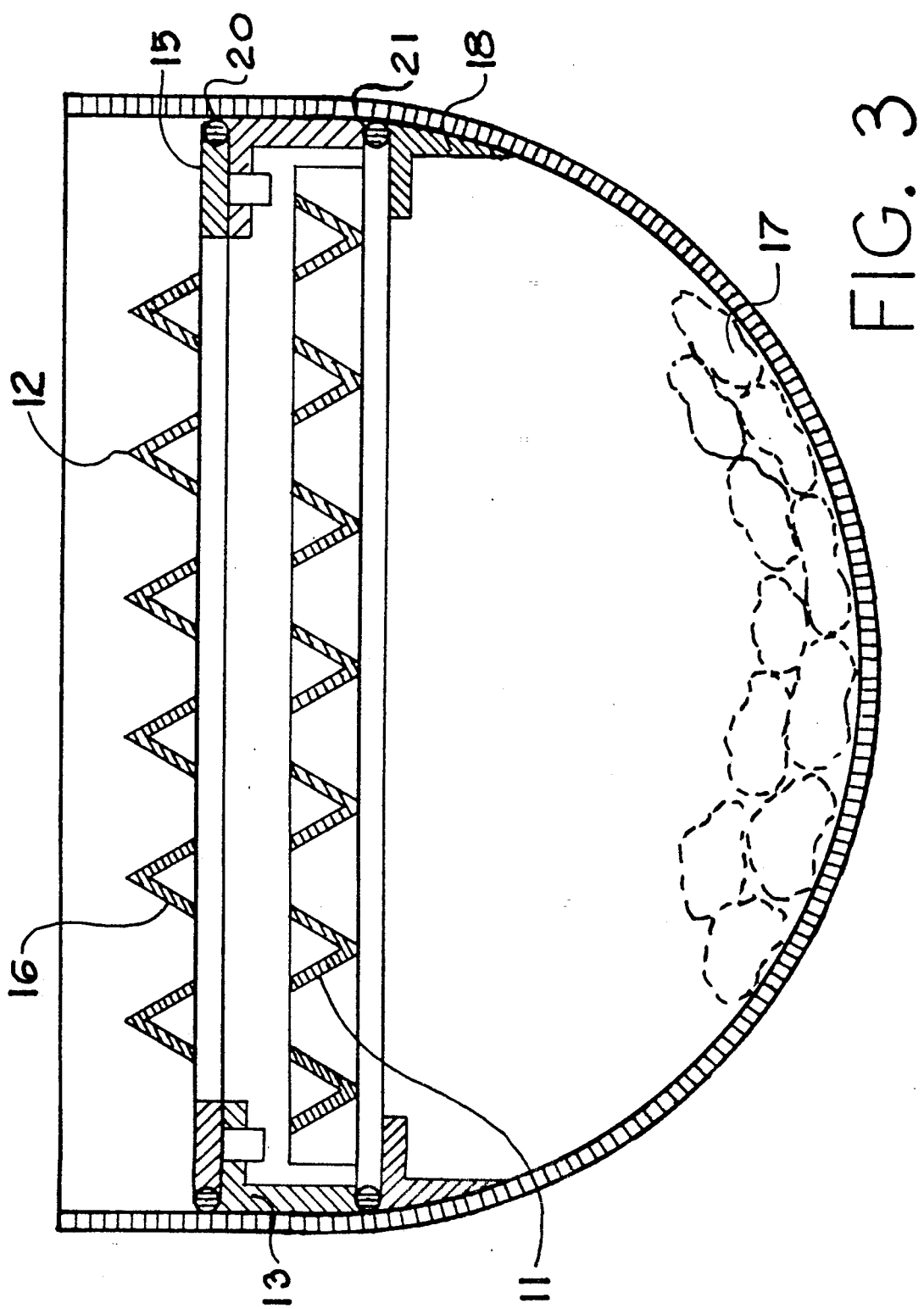
FIG. 3 contains cross-sectional views 3a—3a and 3b—3b illustrating the first grill ring in position above the second grill ring and how the grill would fit into a conventional barbeque kettle.
Figure 4:
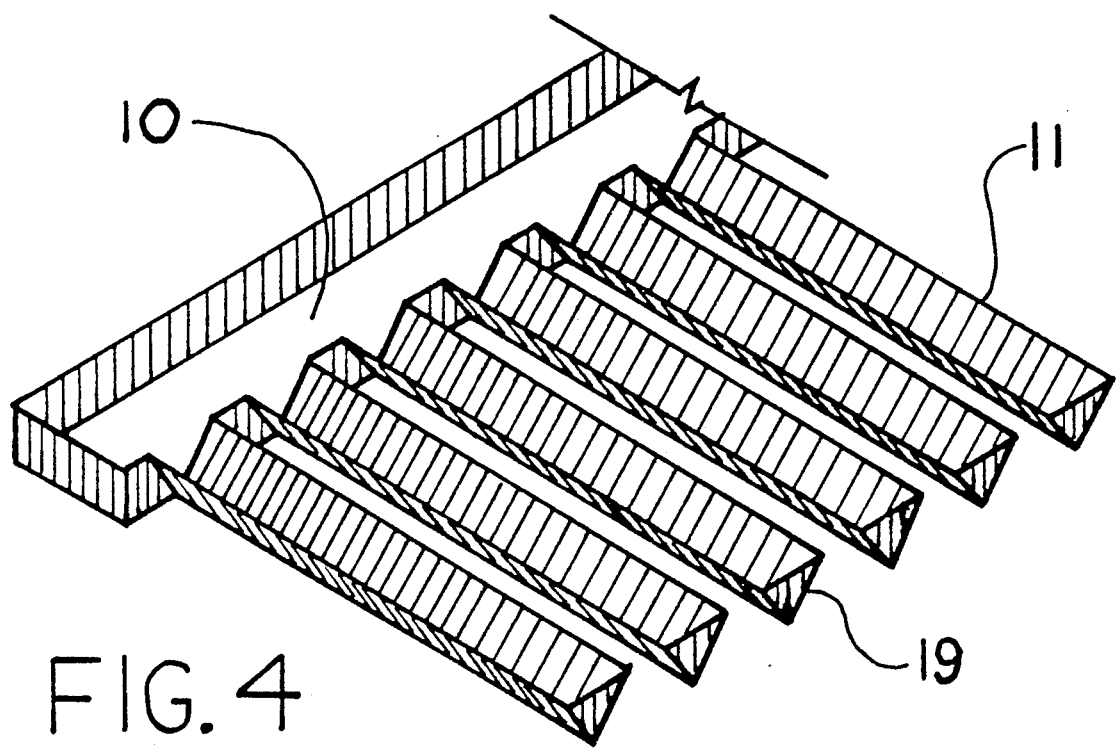
FIG. 4 is a perspective view of the water reservoir, the upright channels which serve as water troughs, and the sealed ends of the troughs.
Figure 5:
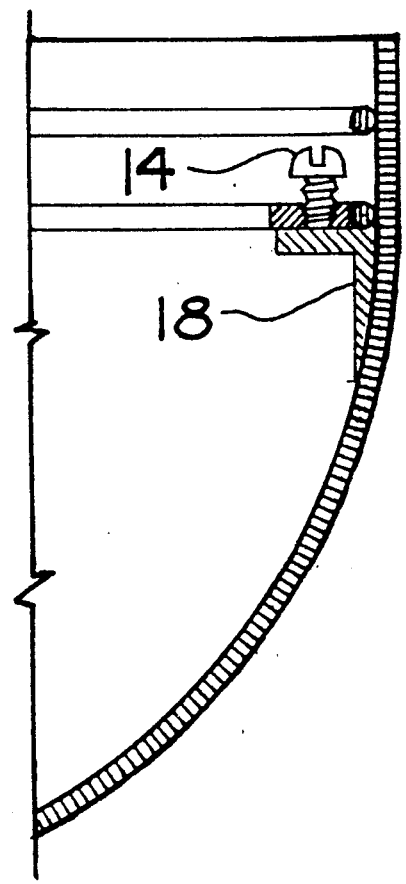
FIG. 5 is a cross-sectional view of the second grill ring showing the water level adjusting device.

Referring now to the drawing:

The plan view FIG. 1 illustrates the metal cooking surfaces 12 as well as the metal grease deflectors 16 which are welded to the first grill ring 20 and which are shown in greater detail in FIG. 3. FIG. 1 also illustrates the four steel alignment lugs 15 which are positioned at 90 degree intervals around the inside circumference of the first grill ring 20 and which are shown in greater detail in FIG. 3.

Figure 2:
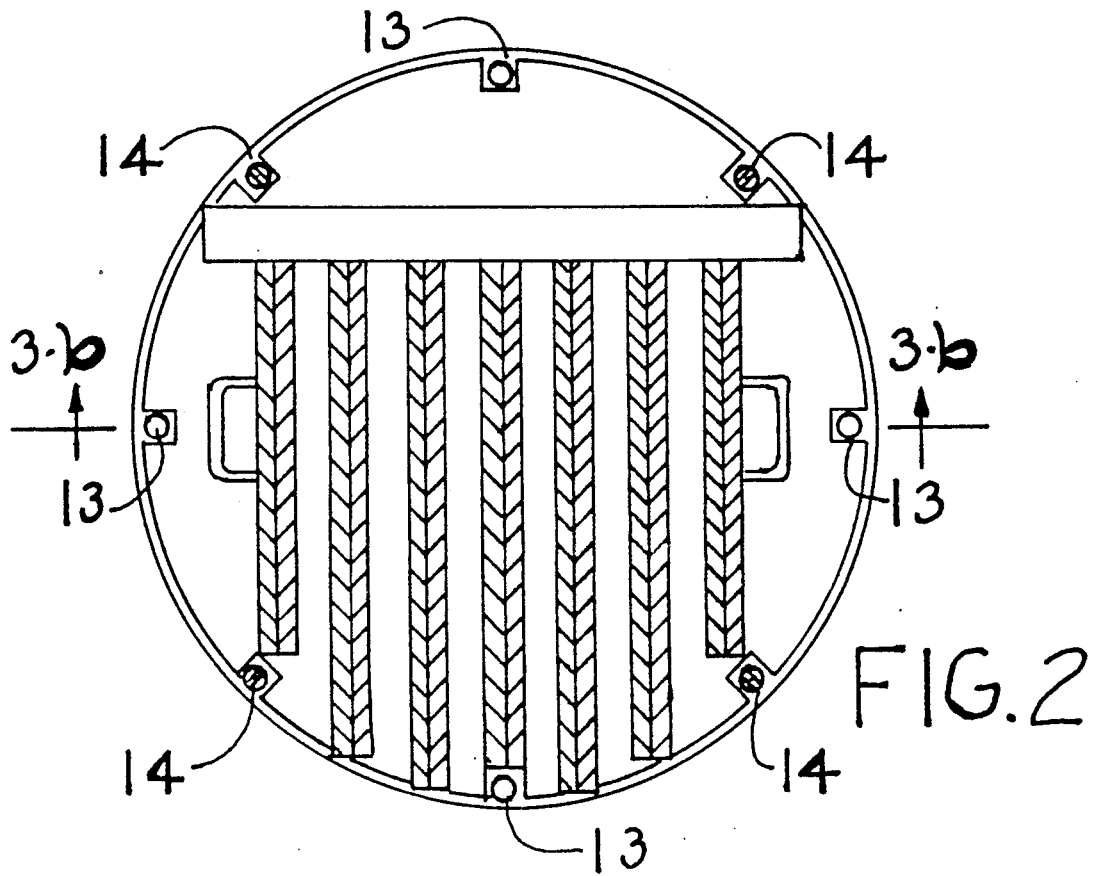
FIG. 2 is a plan view of the second grill ring incorporating the water troughs.

The plan view FIG. 2 illustrates the design of the second grill ring showing the arrangement of the steel water troughs 11 which are open and connected at one end to the water reservoir 10 and which are sealed at their opposite ends 19 all of which are welded to the second grill ring 21.

Also shown in FIG. 2, as well as in the cross-section entitled DETAIL, are the leveling screws 14 which are welded at 90 degree intervals around the inside circumference of grill ring 21 and the vertical steel spacer brackets 13 which are positioned at alternate 90 degree intervals from the leveling screws 14 and which are welded to the top edge of grill ring 21.

FIG. 3 includes cross-sections 3a—3a and 3b—3b taken from FIGS. 1 and 2 respectively and illustrates the spacer brackets 13 and the alignment lugs 15. (the supporting brackets 18 are normally supplied and positioned by the kettle manufacturer at 90 degree intervals) The water troughs 11 are located below and parallel to but on alternate centerlines from the vertexes of the inverted channels above which serve as the cooking surface.

I claim:

1. A grill for supporting food in a barbeque kettle comprising:

first grill means comprising
   a first grill ring,
   a plurality of spaced, inverted channels mounted on the first grill ring, the channels having longitudinal axes arranged parallel to each other and substantially horizontal for supporting food during cooking, and
at least one alignment lug on the first grill means;
second grill means comprising:
a second grill ring,
a plurality of spaced, upright channels mounted on the second grill ring, the channels having longitudinal axes arranged parallel to each other and substantially horizontal,
at least one spacer bracket integral with the second grill ring and extending upwardly from the second grill ring for supporting the first grill means on the at least one spacer bracket above the second grill means,
a water reservoir mounted on the second grill and integral with the upright channels, the upright channels opening into the water reservoir and the water reservoir being adapted to hold water and to permit the water placed in the reservoir to flow between the reservoir and the channels, and
adjustable support means mounted on the second grill ring for permitting the second grill means to be leveled;
the at least one alignment lug cooperating with the at least one spacer bracket when the first grill means is mounted on the second grill means to align the inverted and upright channels such that the upright channels of the second grill means are substantially directly below the spaces between the inverted channels of the first grill means, the grill being adapted to collect grease released from the food during cooking on the first grill into the inverted channels and water reservoir and prevent the grease from burning.

2. A barbeque apparatus comprising
a kettle for holding fuel,
grill support means mounted on the kettle, and
a grill adapted to rest on the grill support means and simultaneously support food on the grill, the grill comprising:
first grill means comprising
a first grill ring,
a plurality of spaced, inverted channels mounted on the first grill ring, the channels having longitudinal axes arranged parallel to each other and substantially horizontal for supporting food during cooking, and
at least one alignment lug on the first grill means;
second grill means comprising:
a second grill ring,
a plurality of spaced, upright channels mounted on the second grill ring, the channels having longitudinal axes arranged parallel to each other and substantially horizontal,
at least one spacer bracket integral with the second grill ring and extending upwardly from the second grill ring for supporting the first grill means on the at least one spacer bracket above the second grill means,
a water reservoir mounted on the second grill ring and integral with the upright channels, the upright channels opening into the water reservoir, the water reservoir being adapted to hold water and to permit the water placed in the reservoir to flow between the reservoir and the channels,
and adjustable support means mounted on the second grill ring for permitting the second grill means to be leveled;
the at least one alignment lug cooperating with the at least one spacer bracket when the first grill means is mounted on the second grill means to align the inverted and upright channels such that the upright channels of the second grill means are substantially directly below the spaces between the inverted channels of the first grill means, the grill being adapted to collect grease released from the food during cooking on the first grill in the inverted channels and water reservoir and prevent the grease from burning.

* * * * *

UNITED STATES PATENT AND TRADEMARK OFFICE
CERTIFICATE OF CORRECTION

PATENT NO.  : 5,044,266
DATED       : September 3, 1991
INVENTOR(S) : Robert S. Geocaris It is certified that error appears in the above-identified patent and that said Letters Patent is hereby corrected as shown below:

Title page:

Item (76) inventor, should read -- Robert S. Geocaris--.

Signed and Sealed this

Twelfth Day of May, 1992

Attest:

DOUGLAS B. COMER

Attesting Officer

Acting Commissioner of Patents and Trademarks